US006895402B1

(12) United States Patent
Emens et al.

(10) Patent No.: US 6,895,402 B1
(45) Date of Patent: May 17, 2005

(54) DETECTING FRAMING OF A NETWORK RESOURCE IDENTIFIED BY A TARGET UNIFORM RESOURCE LOCATOR

(75) Inventors: Michael Lawrence Emens, San Jose, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,179

(22) Filed: Aug. 25, 1999

(51) Int. Cl.[7] ............................................. G06F 17/30
(52) U.S. Cl. ..................... 707/10; 707/5; 707/104.1; 715/501; 715/513; 713/200; 709/220
(58) Field of Search ................... 707/1–10, 100–104.1, 707/200–205, 500–501.1, 512–514; 345/854, 848, 804, 968; 709/200–230; 713/200–202; 715/501, 513

(56) References Cited

U.S. PATENT DOCUMENTS

| | | | |
|---|---|---|---|
| 5,870,550 A | | 2/1999 | Wesinger, Jr. et al. ....... 709/218 |
| 5,890,170 A | | 3/1999 | Sidana ..................... 707/501.1 |
| 5,903,892 A | * | 5/1999 | Hoffert et al. ................ 707/10 |
| 5,987,454 A | * | 11/1999 | Hobbs ............................ 707/4 |
| 6,035,330 A | * | 3/2000 | Astiz et al. .................. 709/218 |
| 6,049,821 A | * | 4/2000 | Theriault et al. ........... 709/203 |
| 6,144,991 A | * | 11/2000 | England ..................... 709/205 |
| 6,243,700 B1 | * | 6/2001 | Zellweger ...................... 707/3 |
| 6,289,341 B1 | * | 9/2001 | Barney .......................... 707/6 |
| 6,317,777 B1 | * | 11/2001 | Skarbo et al. .............. 709/204 |
| 6,327,045 B1 | * | 12/2001 | Teng et al. ................. 358/1.15 |
| 6,510,461 B1 | * | 1/2003 | Nielsen ...................... 709/224 |
| 6,564,257 B1 | * | 5/2003 | Emens et al. ............... 709/219 |
| 6,578,078 B1 | * | 6/2003 | Smith et al. ................ 709/224 |
| 6,662,310 B2 | * | 12/2003 | Lopez et al. .................. 714/15 |

FOREIGN PATENT DOCUMENTS

| | | | | |
|---|---|---|---|---|
| WO | WO 98/40823 | 9/1998 | ........... | G06F/13/00 |
| WO | WO 98/48546 | 10/1998 | ........... | H04L/29/06 |
| WO | WO 99/08210 | 2/1999 | ........... | G06F/17/30 |
| WO | WO00/26762 | * 5/2000 | ............ | G06F/7/00 |

OTHER PUBLICATIONS

IBM, "A Method for Synchronizing the Display of Web Pages Consisting of Frames", Research Disclosure, 41295, Aug. 1998, pp. 1136–1137.
IBM, "A Process for Resetting Proxy Authorization Values that are Automatically Cached by Web Browsers Developed for Pervasive Computing Devices", Research Disclosure, 41480, Oct. 1998, p. 1391. only.
IBM, "Pipe Beans: Components for Implementing Software Pipelines", Research Disclosure, 41582, Nov. 1998, p. 1513.
Displaying Web Pages in Frames, IBM Technical Disclosure Bulletin, vol. 40, No. 11, Nov. 1997, p. 95.
"Focus Highlight for World Wide Web Frames", IBM Technical Disclosure Bulletin, vol. 40, No. 11, Nov. 1997, p. 89.

* cited by examiner

Primary Examiner—Srirama Channavajjala
(74) Attorney, Agent, or Firm—Alison D. Mortinger; Marc D. McSwain

(57) ABSTRACT

A computer-implemented method for detecting framing of a network (such as the Internet or an intranet) resource identified by a target uniform resource locator (URL), by locating a suspect URL and an associated suspect page which reference the target URL, examining the suspect page for the existence of framing, if framing exists, then checking to see if the target URL is referenced within a frame, and if the target URL is referenced within the frame, then identifying the suspect URL and the associated suspect page as framing the network resource.

23 Claims, 3 Drawing Sheets

DETECTING FRAMING OF A NETWORK RESOURCE IDENTIFIED BY A TARGET UNIFORM RESOURCE LOCATOR

TECHNICAL FIELD

This invention relates to Internet search technology, and more particularly to the detection of whether a network resource such as a web page is being framed.

BACKGROUND OF THE INVENTION

It is a common practice on a network such as the Internet or an intranet ("net," commonly) to have multiple-frame pages in which a page is divided into multiple sub-pages. Each of these subpages can display the contents of multiple resources such as but not limited to Hypertext Markup Language (HTML) pages, images, or graphics files. These resources are commonly accessed by the use of an address-type identifier called a uniform resource locator, or URL.

In a multiple-frame page, resources from different owners can easily be presented together as shown in FIG. 1. The multiple-frame web page 100 in this case is accessed by entering the URL for website A (www.we-frame-patents.com). A's sub-page 102 appears on the left side of the screen, and frames B's sub-page 104, in this case the IBM Patent Server (www.ibm.patents.com), which appears on the right side of the screen. Note that the position of the sub-pages is not important; because site A's URL was entered, its is the framing sub-page.

With framing, the potential for misuse of a network resource is great. The owner of site B has no control over (and often no knowledge of) site A's use of the site B resource, because it is only a matter of establishing a link to the site B by using B's URL in A's site design. This misuse can come in many forms, such as defamation, libel, or copyright infringement.

Thus, in order to protect one's network resources, it is desirable to detect instances where the content of one's website is being framed by another website. When instances of framing are detected, then the framing pages can be checked to see if such use amounts to misuse, and appropriate action can be taken.

SUMMARY OF THE INVENTION

A computer-implemented method for detecting framing of an network resource identified by a target uniform resource locator (URL), by locating a suspect URL and an associated suspect page which reference the target URL, examining the suspect page for the existence of framing, if framing exists, then checking to see if the target URL is referenced within a frame, and if the target URL is referenced within the frame, then identifying the suspect URL and the associated suspect page as framing the Internet resource, is described.

A program storage device accessible by a machine, tangibly embodying a program of instructions executable by the machine to perform the method steps for framing of a network resource identified by a target uniform resource locator (URL), by locating a suspect URL and an associated suspect page which reference the target URL, examining the suspect page for the existence of framing; if framing exists, then checking to see if the target URL is referenced within a frame, and if the target URL is referenced within the frame, then identifying the suspect URL and the associated suspect page as framing the Internet resource is also described.

A system for detecting framing of a network resource identified by a target uniform resource locator (URL), having means for locating a suspect URL and an associated suspect page which reference the target URL, means for examining the suspect page for the existence of framing, means for checking to see if the target URL is referenced within a frame, and means for identifying the suspect URL and the associated suspect page as framing the network resource is further described.

For a fuller understanding of the nature and advantages of the present invention, reference should be made to the following detailed description taken together with the accompanying figures.

DESCRIPTION OF THE PREFERRED EMBODIMENTS

Figure 1:
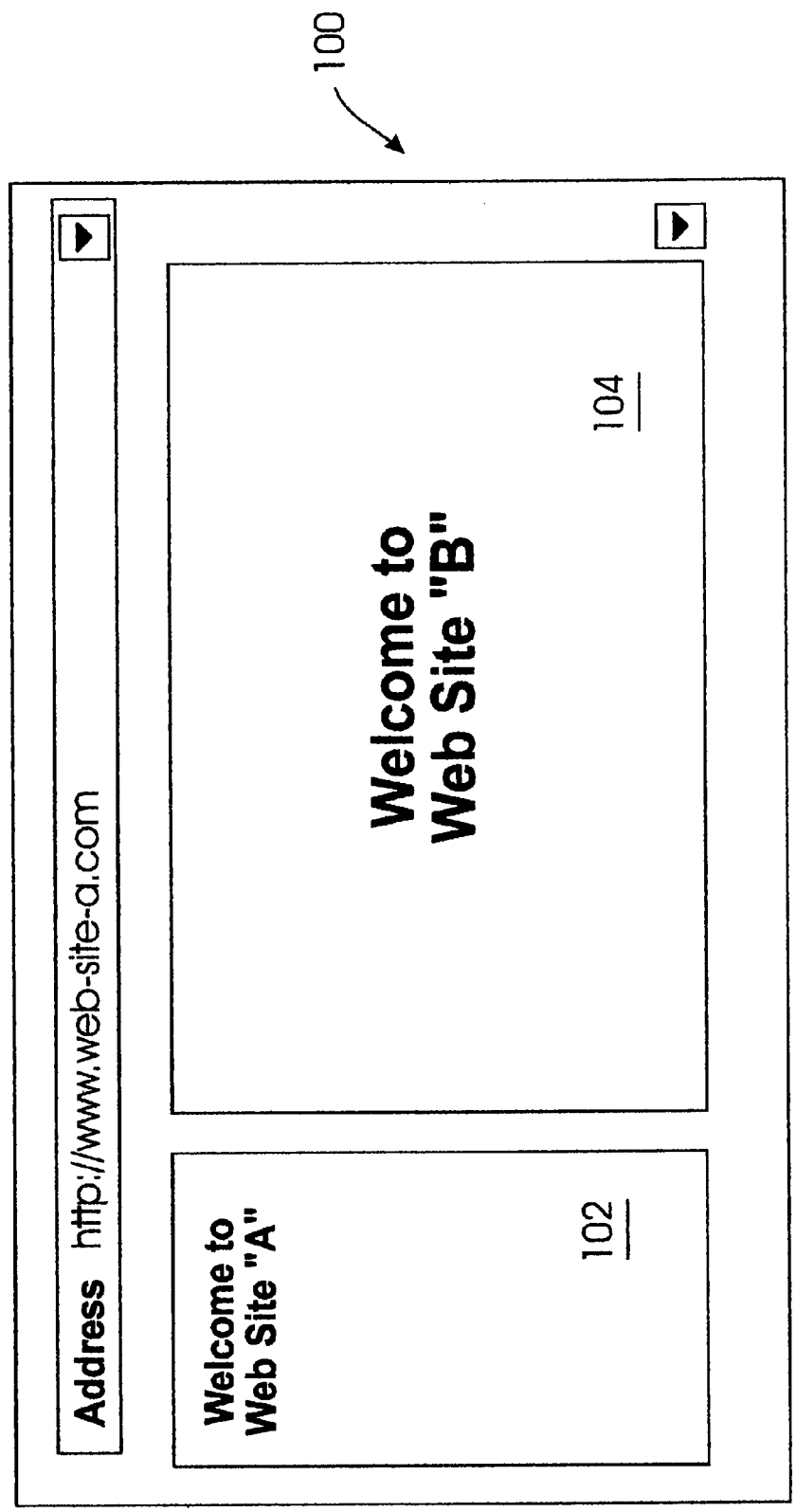
FIG. 1 is an example of framing.
Figure 2:
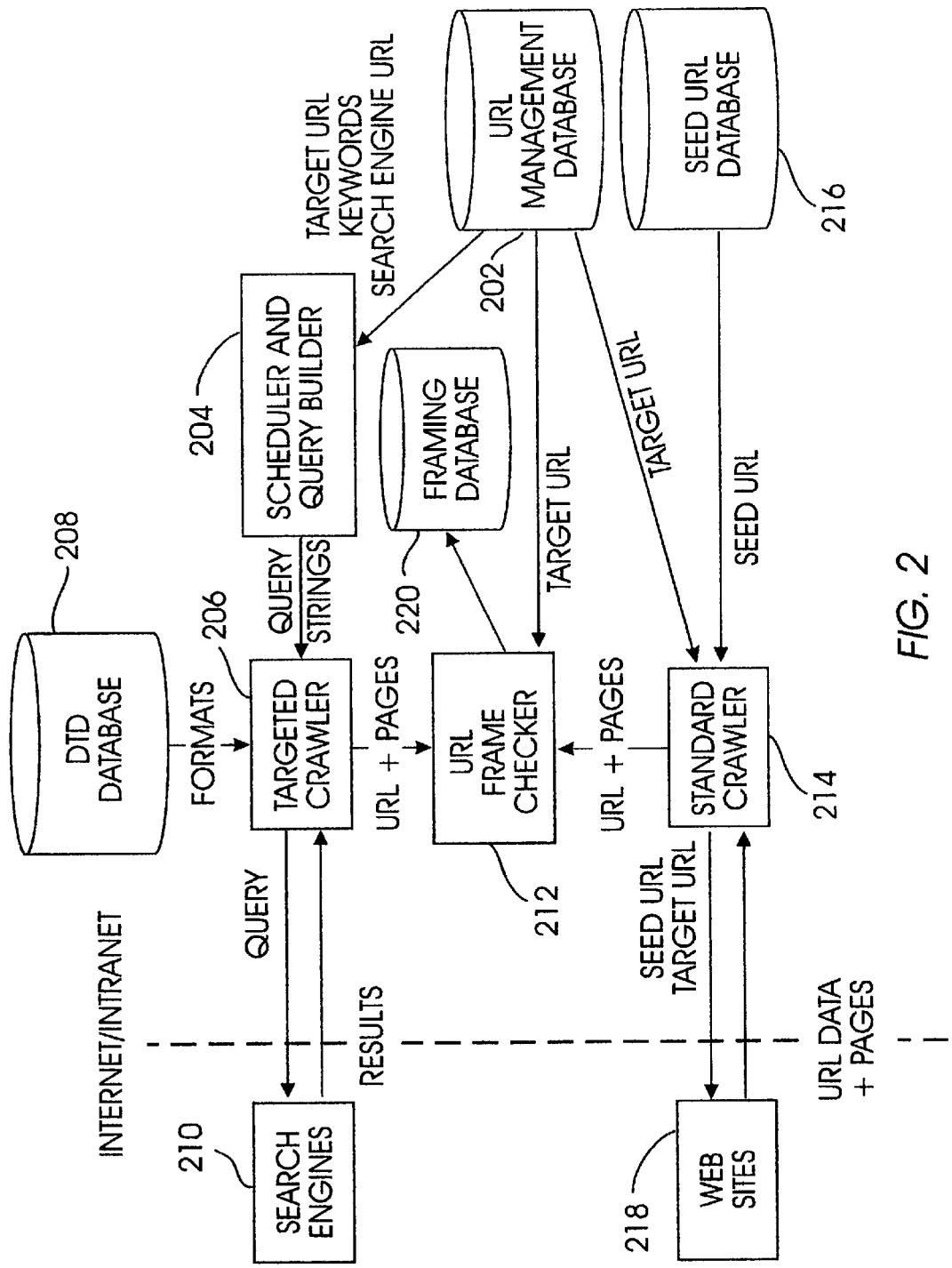
FIG. 2 shows the architecture for framing detection.

FIG. 2 shows the architecture for the framing detection. The following is a summary of the architecture components:

URL Management Database—Stores the input parameters for the framing search;

Seed Database—Stores seed URLs for the Standard Crawler;

Scheduler and Query Builder—Schedules the search and builds query strings;

Targeted Crawler—Builds and issues queries and interprets results;

DTD Database—Stores formats for the search and search results;

Standard Crawler—Standard "brute force" web crawler;

URL Framechecker—Checks search results for framing the target URL; and

Match Database—Stores the search results which frame the target URL.

In FIG. 2, the Uniform Resource Locator (URL) Management Database 202 stores (1) a crawl schedule, which determines when the framing search occurs, (2) at least one target URL to be searched for framing (i.e. checked to see if it is being framed), (3) any keywords to be used with the search, and (4) URL(s) for the search engine(s) to be used.

Note that keywords are not necessary but may be desirable since some search engines don't support a query by URL, because the target URL is not always indexed.

According to the Crawl Schedule, URL Management Database 202 passes the target URL, the keywords, and the search engine URL to a Scheduler and Query Builder 204. Scheduler and Query Builder 204 then builds a list of query strings based upon the information passed from Databases 202 and 204 (the target URL and any keywords). The query string list is then passed to Targeted Crawler 206. Targeted Crawler 206 uses Document Type Definition (or Document Type Declaration, DTD) Database 208 as an input. DTD Database 208 stores (1) query string formats expected by each search engine 210 (such as Hotbot, Yahoo!, Excite, etc), and (2) formats for the search results so that the results can be correctly interpreted, e.g. which fields of the results set contain relevant information.

Scheduler 204 then invokes Targeted Crawler 206, which builds a query based upon the query string list, along with the formats from DTD Database 208 and formulates a query for each specified Search Engine. The query is issued to Search Engine 210, and in most cases, the Search Engine will present results. The results are most often in the form of URLs and a short description for each, or abstracts. Targeted Crawler 206 interprets the results according to the formats from DTD Database 208 and queries each of the resultant URLs once (also known as crawling one level deep) in an attempt to get the document or page associated with the resultant URL. The resultant URLs and their associated pages are then passed to URL Framechecker 212.

Also according to the Crawl Schedule (which may set the Standard Crawler to run at the same or different time than the Targeted Crawler), Seed URL Database 216 passes at least one seed URL to Standard Crawler 214. URL Management Database 202 also passes the target URL to Standard Crawler 214. Standard Crawler 214 crawls Internet web sites 218 as standard crawlers do today, for example Spidey from IBM. There are several crawler techniques, however most standard crawlers are recursively based where they parse the results of an initial query to get more URLs, and those new URLs are subsequently queried. This process continues indefinitely. Standard Crawler 214 then passes the resultant URLs and their associated pages to URL Framechecker 212.

Note that the two crawler methods are used because each will likely return different results. Because the Targeted Crawler uses keywords and queries the search engine(s) only once, less URLs will be returned. In contrast, the Standard Crawler will crawl a large portion (if not all) of the Internet since a recursive process is used in a brute force approach. Thus many more URLs will be returned. Both are desirable since each may not find results found by the other.

URL Framechecker 212 takes the resultant URLs and their associated pages from both Crawlers and checks each page to see if the target URL is being framed by examining the structured page definition, for example the language which defines the page. If the target URL is being framed, then the resultant URL and the associated page are identified as such and stored in a Framing Database 220. The contents of Framing Database 220 are then examined (either manually or in an automated fashion) to see if the framing is undesirable.

EXAMPLE

Following is a simplified example of how the Framing Detection works to see if the website with the target URL www.ibm.patents.com (the IBM patent server) is being framed. The user also wants to use the keywords IBM and patent in the search, and wants to use the search engine Hotbot. The user inputs the website URL, the keywords, and the search engine URL (www.hotbot.com) into the URL management database, and sets the crawl schedule to run both crawlers when the Internet is least busy, for example at 3:00 am. The user wants particularly to start the search within the information processing industry so the user inputs seed URLS of www.sun.com, www.hp.com, and www.microsoft.com into the seed URL database.

The Scheduler and Query Builder regularly checks the crawl schedule, and at 3:00 am begins the Framing Detection. The Scheduler builds a query string list based upon the target URL and the keywords, and passes the list to the Targeted Crawler.

The Targeted Crawler then consults the DTD database for the correct format for querying the Hotbot search engine, and builds a boolean query based upon www.patents.ibm.com or (IBM and patent). Targeted Crawler then issues the query to www.hotbot.com. When the results are received, Targeted Crawler again consults the DTD database, this time for how to interpret the results. In this case, Hotbot returns a list of resultant URLs, each followed by an abstract (description of the contents of the web page referenced by the URL). Targeted Crawler then queries each resultant URL, downloads the page found, and passes the page (plus its associated URL) to the URL Framechecker.

Standard Crawler also checks the Crawl Schedule and at 3 am starts with the seed URLs www.sun.com, www.hp.com, and www.microsoft.com and queries each in turn, looking for any inclusion of the target URL (www.ibm.patents.com). As each page is read, any links included are extracted and put back into a seed list for further querying. Any pages found which include the target URL are downloaded (with the associated URL) to the URL Framechecker.

Figure 3:
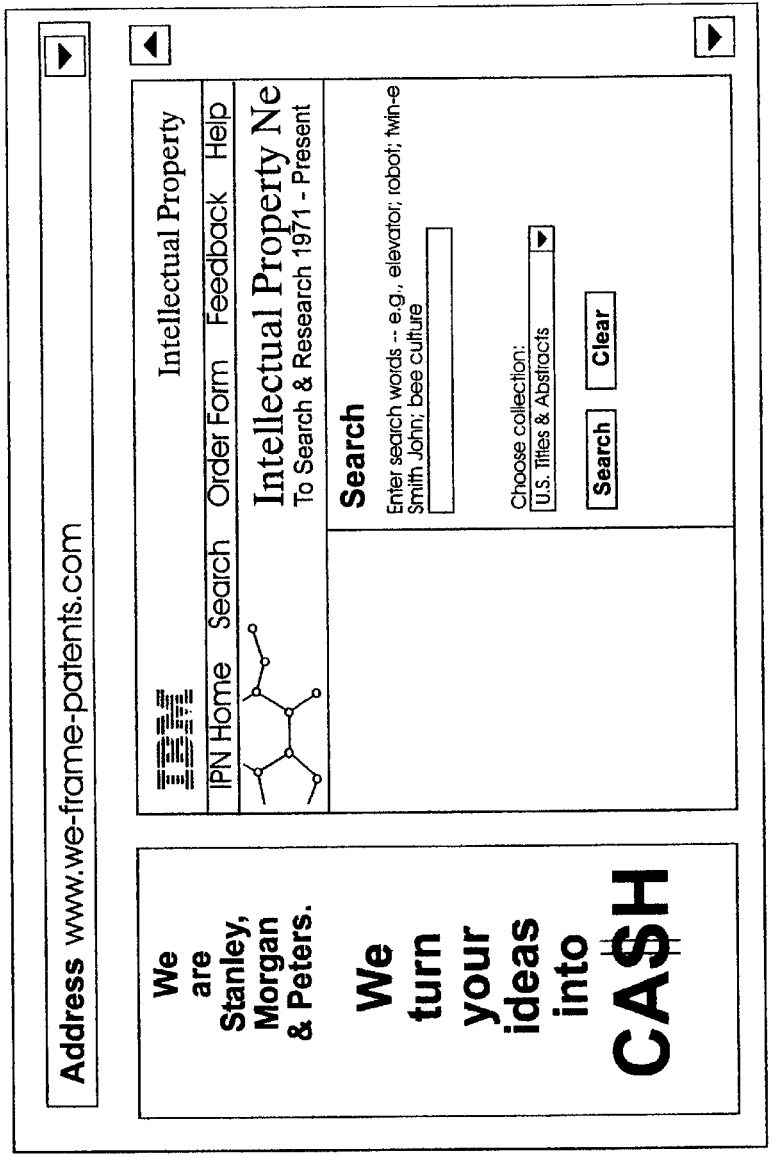
FIG. 3 shows an example of framing with the associated page definition language; all in accordance with the present invention.

A resultant page from either Crawler may be for example as shown in FIG. 3, with a resultant URL of www.we-frame-patents.com which contains 2 frames, with the page defined in HyperText Markup Language (HTML) as shown. Note that the HTML is much simplified, with the page layout specifications (columns and rows) replaced by " . . . ". Note also that the Framechecker could detect framing in other page definition languages as well such as XML or SGML. The URL Framechecker then examines the page definition and looks to see if framing exists in the page by checking for a frame tag. Here, the presence of the word <FRAMESET> indicates that framing is present; other structured page definitions may utilize different frame tags.

The Framechecker then checks for the target URL within a reference statement in the FRAMESET; here the second frame does reference the target URL of www.ibm.patents.com by using an HREF statement. The URL is then identified as framing the target URL and stored (along with the associated page) in the Framing Database for later examination. Here, a check of www.we-frame-patents is likely to discover that www.ibm.patents has been used in an unauthorized manner, and the owner of www.ibm.patents may pursue a discussion regarding copyright infringement or licensing.

The framing detection described above can be performed on any suitable system including a processing apparatus, an input device, and an output device. The processing apparatus may be for example (but not limited to) a personal computer, a laptop computer, mainframe computer, palmtop computer, or personal assistant. The input device may be for example (but not limited to) a keyboard, mouse, trackball, or voice recognition device. The output device may be for example (but not limited to) a monitor, printer, other computer, data storage device, or computer network.

The logic of the present invention may be executed by a processor as a series of computer-executable instructions. The instructions may be contained on any suitable data storage device with a computer accessible medium, such as but not limited to a computer diskette having a computer usable medium with program code stored thereon, a DASD array, magnetic tape, conventional hard disk drive, electronic read-only memory, or optical storage device.

In summary, a way to detect framing of an Internet resource has been described, in an automated manner. With the use of either or both of two types of crawlers, large portions of the Internet may be searched, and instances of potential framing are saved for later examination.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A computer-implemented method for detecting framing of a network resource identified by a target uniform resource locator (URL), comprising the steps of:

locating a suspect URL and an associated suspect page which reference the target URL;

examining the suspect page for the existence of framing;

if framing exists, then checking to see if the target URL is referenced within a frame; and if the target URL is referenced within the frame, then identifying the suspect URL and the associated suspect page as framing the network resource.

2. The method of claim 1 wherein locating a suspect URL further comprises the step of issuing a query to a search engine, the query formatted specifically for the search engine.

3. The method of claim 2 wherein the query is based upon the target URL.

4. The method of claim 3 wherein the query is also based upon at least one keyword.

5. The method of claim 2 wherein the search engine returns a result, further comprising the steps of:

interpreting the result to find a resultant URL;

querying the URL to find a web page associated with the resultant URL; and if an associated web page is found, identifying the resultant URL as a suspect URL and identifying the associated web page as a suspect web page.

6. The method of claim 5 further comprising storing the suspect URL and the suspect web page.

7. The method of claim 1 wherein examining the suspect page for the existence of framing further comprises searching for a frame tag in the structured page definition.

8. The method of claim 7 wherein the structured page definition is HTML, and the frame tag is FRAMESET.

9. The method of claim 8 wherein checking to see if the target URL is referenced within a frame further comprises searching for an HREF statement.

10. A program storage device accessible by a machine, tangibly embodying a program of instructions executable by the machine to perform the method steps for detecting framing of a network resource identified by a target uniform resource locator (URL), said method steps comprising:

locating a suspect URL and an associated suspect page which reference the target URL;

examining the suspect page for the existence of framing;

if framing exists, then checking to see if the target URL is referenced within a frame; and if the target URL is referenced within the frame, then identifying the suspect URL and the associated suspect page as framing the network resource.

11. The program storage device of claim 10 wherein locating a suspect URL further comprises the step of issuing a query to a search engine, the query formatted specifically for the search engine.

12. The program storage device of claim 11 wherein the query is based upon the target URL.

13. The program storage device of claim 12 wherein the query is also based upon at least one keyword.

14. The program storage device of claim 10 wherein the search engine returns a result, further comprising the steps of:

interpreting the result to find a resultant URL;

querying the URL to find a web page associated with the resultant URL; and if an associated web page is found, identifying the resultant URL as a suspect URL and identifying the associated web page as a suspect web page.

15. The program storage device claim 14 further comprising storing the suspect URL and the suspect web page.

16. The program storage device of claim 10 wherein examining the suspect page for the existence of framing further comprises searching for a frame tag in the structured page definition.

17. A system for detecting framing of a network resource identified by a target uniform resource locator (URL), comprising:

means for locating a suspect URL and an associated suspect page which reference the target URL;

means for examining the suspect page for the existence of framing;

means for checking to see if the if the target URL is referenced within a frame; and means for identifying the suspect URL and the associated suspect page as framing the network resource.

18. The system of claim 17 wherein the locating means further comprises means for issuing a query to a search engine, the query formatted specifically for the search engine.

19. The system of claim 18 wherein the query is based upon the target URL.

20. The system of claim 19 wherein the query is also based upon at least one keyword.

21. The system of claim 18 wherein the search engine returns a result, further comprising:

means for interpreting the result to find a resultant URL;

means for querying the URL to find a web page associated with the resultant URL; and means for identifying the resultant URL as a suspect URL and identifying the associated web page as a suspect web page.

22. The system of claim 21 further comprising means for storing the suspect URL and the suspect web page.

23. The system of claim 17 wherein the examining means further comprises means for searching for a frame tag in the structured page definition.

* * * * *